United States Patent
Li

(10) Patent No.: US 10,739,881 B2
(45) Date of Patent: Aug. 11, 2020

(54) MANUFACTURING METHOD FOR DISPLAY PANEL, SYSTEM FOR MANUFACTURING DISPLAY PANEL AND DISPLAY PANEL

(71) Applicant: Wuhan China Star Optoelectronics Semiconductor Display Technology Co., LTd., Wuhan, Hubei (CN)

(72) Inventor: Yun Li, Guangdong (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 110 days.

(21) Appl. No.: 16/033,213

(22) Filed: Jul. 12, 2018

(65) Prior Publication Data

US 2019/0235652 A1 Aug. 1, 2019

Related U.S. Application Data

(63) Continuation of application No. PCT/CN2018/077110, filed on Feb. 24, 2018.

(30) Foreign Application Priority Data

Jan. 31, 2018 (CN) .......................... 2018 1 0099404

(51) Int. Cl.
*G06F 1/00* (2006.01)
*G06F 3/041* (2006.01)
(Continued)

(52) U.S. Cl.
CPC ................ *G06F 3/041* (2013.01); *B32B 7/05* (2019.01); *B32B 17/00* (2013.01);
(Continued)

(58) Field of Classification Search
None
See application file for complete search history.

(56) References Cited

U.S. PATENT DOCUMENTS 10,103,351 B1 10/2018 Li et al.
10,158,100 B2 12/2018 Yu
(Continued)

FOREIGN PATENT DOCUMENTS

CN 104102032 A 10/2014
CN 104238823 A 12/2014
(Continued)

*Primary Examiner* — Reema Patel

(57) ABSTRACT

The present disclosure discloses a method for manufacturing a display panel, a system for manufacturing a display panel and a display panel. The display panel includes a substrate lining and a substrate assembly, the substrate lining including a U-shaped connecting portion, a first supporting portion and a second supporting portion. The method includes aligning the first end of the substrate assembly and the first supporting portion of the substrate lining, pressing the first end of the substrate with the first supporting portion of the substrate lining, rotating the substrate lining to laminate the U-shaped connecting portion with a corresponding position of the substrate assembly, and pressing the position of the substrate assembly corresponding to the second supporting portion in the substrate lining with the second supporting portion in the substrate lining. This method may increase the percentage of the display area of the display panel.

8 Claims, 9 Drawing Sheets

(51) Int. Cl.
    *B32B 17/00*       (2006.01)
    *B32B 7/05*        (2019.01)

(52) U.S. Cl.
    CPC .................. *B32B 2457/208* (2013.01); *G06F 2203/04102* (2013.01); *G06F 2203/04103* (2013.01)

(56) References Cited

U.S. PATENT DOCUMENTS

| | | |
|---|---|---|
| 2016/0101610 A1 | 4/2016 | Namkung et al. |
| 2018/0224688 A1 | 8/2018 | Chen et al. |

FOREIGN PATENT DOCUMENTS

| | | |
|---|---|---|
| CN | 104471630 A | 3/2015 |
| CN | 107039604 A | 8/2017 |
| KR | 1020150133893 A | 12/2015 |
| KR | 1020170039787 A | 4/2017 |

MANUFACTURING METHOD FOR DISPLAY PANEL, SYSTEM FOR MANUFACTURING DISPLAY PANEL AND DISPLAY PANEL

CROSS-REFERENCE TO RELATED APPLICATIONS

The present application is a continuation application of International (PCT) Patent Application No. PCT/CN2018/077110 filed on Feb. 24, 2018, which claims foreign priority of Chinese Patent Application No. 201810099404.9, filed on Jan. 31, 2018 in the State Intellectual Property Office of China, the entire contents of which are hereby incorporated by reference.

TECHNICAL FIELD

The present disclosure generally relates to a field of display technique, and in particular to a manufacturing method for a display panel, a system for manufacturing a display panel and a display panel.

BACKGROUND

In recent years, flat panel displays have been widely used in computer screens, televisions, billboards, digital photo frames, and other devices due to their characteristics of complete planarization, lightness, thinness, and power saving.

The flat panel display module includes a display region and a non-display region. The display region is configured to display image signals, and the non-display region is configured for placement of various circuits and wirings to supply image signals to the display region. The non-display region is disposed outside the display region. With an increasing demand for a high image quality of display devices, the number of various circuits and wirings located in the non-display region of the flat panel display module grows, and thus the area of the non-display region increases, which causes a decrease of an area percentage of the display region in the display device viewed by the user. Therefore, in order to improve the user experience and increase the viewing comfort of the user, the problem to increase the area percentage of the display region in the display panel is urgent to solve in the industry.

SUMMARY

The technical problem mainly to solve by the present disclosure is to provide a method for manufacturing a display panel, a system for manufacturing a display panel and a display panel so as to increase the percentage of the display region of the display panel.

To solve the above technical problem, one technical solution adopted by the present disclosure is as follows.

A method of manufacturing a display panel is provided, including following blocks.

The method includes disposing a touch panel on one side of a flexible substrate.

The method also includes providing a substrate lining on the other side of the flexible substrate. The substrate lining includes a U-shaped connecting portion, and a first supporting portion and second supporting portion which are separately located at two ends of the U-shaped connecting portion and extend toward each other.

The method further includes aligning a first end of the flexible substrate provided with the touch panel with the first supporting portion of the substrate lining.

The method also includes pressing the first end of the flexible substrate provided with the touch panel with the first supporting portion of the substrate lining.

The method further includes laminating the U-shaped connecting portion of the substrate lining with a corresponding position of the flexible substrate provided with the touch panel by rotating the substrate lining.

The method further includes pressing a position of the flexible substrate provided with the touch panel corresponding to the second supporting portion of the substrate lining and the second supporting portion of the substrate lining.

Another technical solution adopted by the present disclosure is as follows.

A system for manufacturing a display panel is provided, including a first apparatus, a first platform, a second platform, and a second apparatus. The first platform adsorbs a substrate assembly. The substrate assembly includes a touch panel, a flexible substrate and an optical adhesive disposed on two sides of the touch panel as well as on a surface of the flexible substrate away from the touch panel. The second platform adsorbs a substrate lining. The substrate lining includes a U-shaped connecting portion, a first supporting portion and a second supporting portion. The first apparatus is configured to press a first end of the substrate assembly with an alignment region of the first supporting portion of the substrate lining, and to rotate the second platform to laminate the U-shaped connecting portion of the substrate lining with a position of the substrate assembly corresponding to the U-shaped connecting portion. And the second apparatus is configured to complete laminating a position of the substrate assembly corresponding to the second supporting portion of the substrate lining with the second supporting portion of the substrate lining.

Another technical solution adopted by the present disclosure is as follows.

A display panel is provided, including a substrate lining, a flexible substrate disposed on the substrate lining and completely covering the substrate lining and a touch panel disposed on the flexible substrate and completely covering the flexible substrate. The substrate lining comprises a U-shaped connecting portion, a first supporting portion and a second supporting portion which are located separately at two ends of the U-shaped connecting portion and extend toward each other.

The beneficial effect of the present disclosure lies in that, differing from the situation of the prior art, the present disclosure provides a method for manufacturing a display panel, including: disposing a touch panel on a flexible substrate, and providing a substrate lining on the other side of the flexible substrate. The substrate lining includes a U-shaped connecting portion, a first supporting portion and a second supporting portion which are located separately at two ends of the U-shaped connecting portion and extend toward each other. The method further includes aligning a first end of the flexible substrate provided with a touch panel with the first supporting portion of the substrate lining, pressing the first end of the flexible substrate with the first supporting portion of the substrate lining, laminating the U-shaped connecting portion of the substrate lining with a corresponding position of the flexible substrate by rotating the substrate lining, and pressing the position of the flexible substrate corresponding to the second supporting portion of the substrate lining with the second supporting portion of the substrate lining. The percentage of the display region of the prepared display panel is increased by this method.

BRIEF DESCRIPTION OF THE DRAWINGS

In order to more clearly illustrate the embodiments of the present disclosure or the technical solutions in the prior art, a brief instruction to the drawings in the embodiment will be described below. Obviously, the drawings in the following description are merely some of the present disclosure. For those skilled in the art, other drawings may also be obtained based on these drawings without paying any creative effort.

DETAILED DESCRIPTION

The technical solutions in the embodiments of the present disclosure will now be described clearly and completely with reference to the accompanying drawings in embodiments. In the following embodiments, the non-conflicting ones may be combined with each other. Obviously, the described embodiments are only a part of the embodiments of the present disclosure, not all of the embodiments. All other embodiments obtained by one with ordinary skills in the art based on the embodiments of the present disclosure without creative efforts shall fall into the protection scope of the present disclosure.

Figure 1:
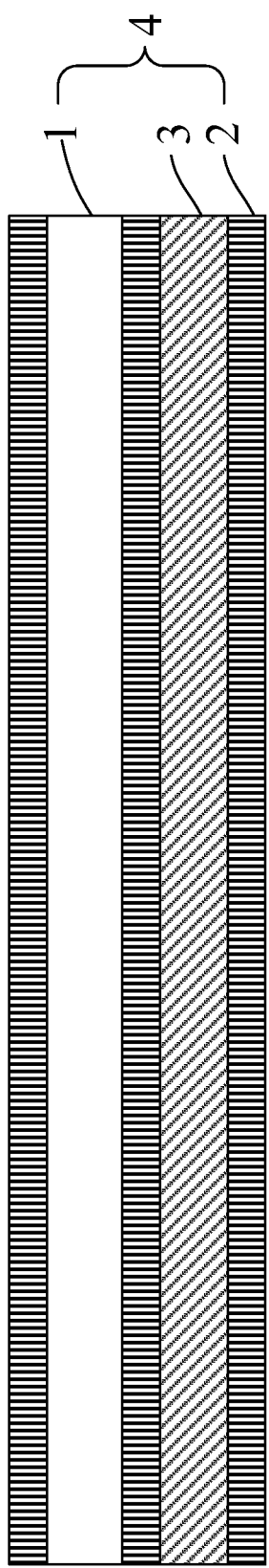
FIG. 1 is a schematic structural view of a substrate assembly of a display panel of the present disclosure.

Referring to FIG. 1, it is a schematic structural view of a substrate assembly of a display panel of the present disclosure. The substrate assembly 4 includes a touch panel 1, a flexible substrate 3, and an optical adhesive 2, wherein the optical adhesive 2 is disposed on an upper surface and a lower surface of the touch panel 1 as well as on a surface of the flexible substrate 3 away from the touch panel 1.

Specifically, the optical adhesive 2 is coated on the upper surface and the lower surface of the touch panel 1 before the touch panel 1 is laminated on an upper surface of the flexible substrate 3, and meanwhile the optical adhesive 2 is coated on the surface on one side of the flexible substrate 3 away from the touch panel 1. Then the touch panel 1 provided with the optical adhesive 2 and the flexible substrate 3 provided with the optical adhesive 2 are pressed to form the substrate assembly 4.

Specifically, the optical adhesive 2 may be an adhesive such as organic silica, acrylic resin and unsaturated polyester, polyurethane, epoxy resin, and the like.

Specifically, the optical adhesive 2 may have a size smaller than the size of the touch panel 1 and the size of the flexible substrate 3 to prevent the optical adhesive 2 from overflowing when pressed.

Specifically, the optical adhesive 2 is coated on the upper surface and the lower surface of the touch panel 1 as well as on the surface on the side of the flexible substrate 3 away from the touch panel 1, and the optical adhesive 2 is coated at this time in a specific pattern.

Specifically, when the touch panel 1 provided with the optical adhesive 2 and the flexible substrate 3 provided with the optical adhesive 2 are pressed together, the selected environment is a decompressed gas environment lower than an atmospheric pressure.

Referring to FIG. 2 to FIG. 7, those are schematic views of a 3D lamination way in which the substrate assembly of the present disclosure is laminated to a substrate lining.

Figure 2:
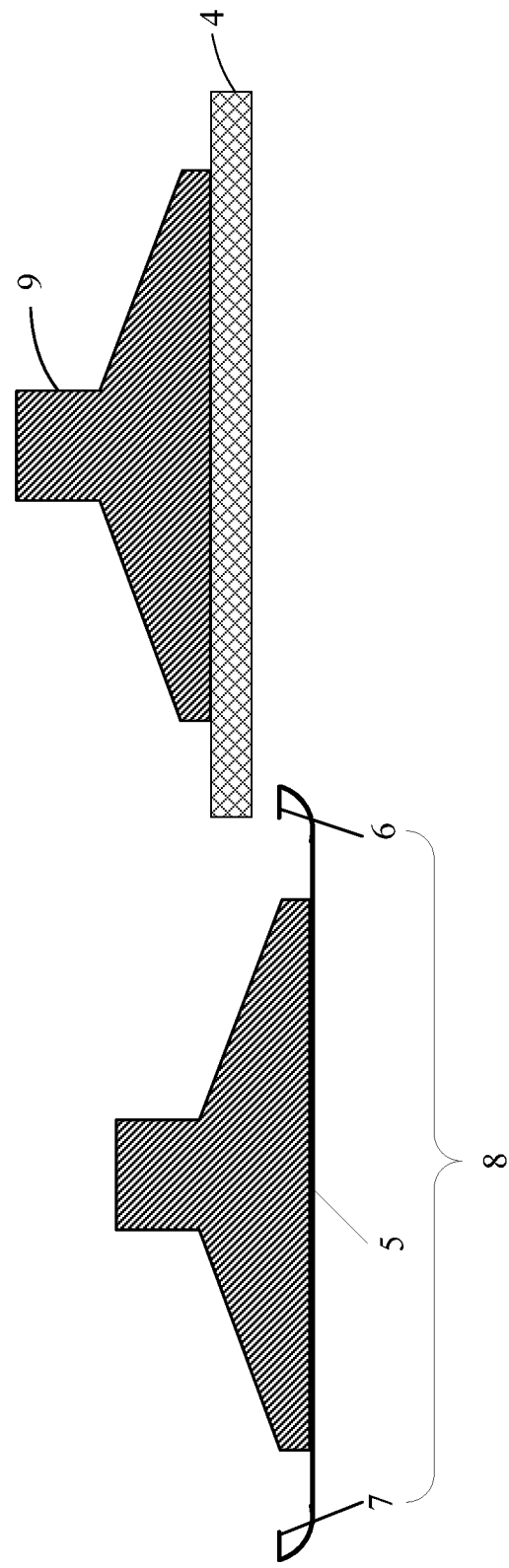
FIGS. 2-7 are schematic views of a 3D lamination way in which the substrate assembly of the present disclosure is laminated to a substrate lining.

Specifically, two micrometer-scale vacuum hole platform devices 9 separately are adsorbed on an upper surface of the substrate lining 8 and an upper surface of the substrate assembly 4, and a first supporting portion 6 of the substrate lining 8 and a first end of the substrate assembly 4 are microscopically aligned, as shown in FIG. 2.

Specifically, a microscopic observation is performed during the process of aligning the first end of the substrate assembly 4 with the first supporting portion 6 of the substrate lining 8.

Figure 3:
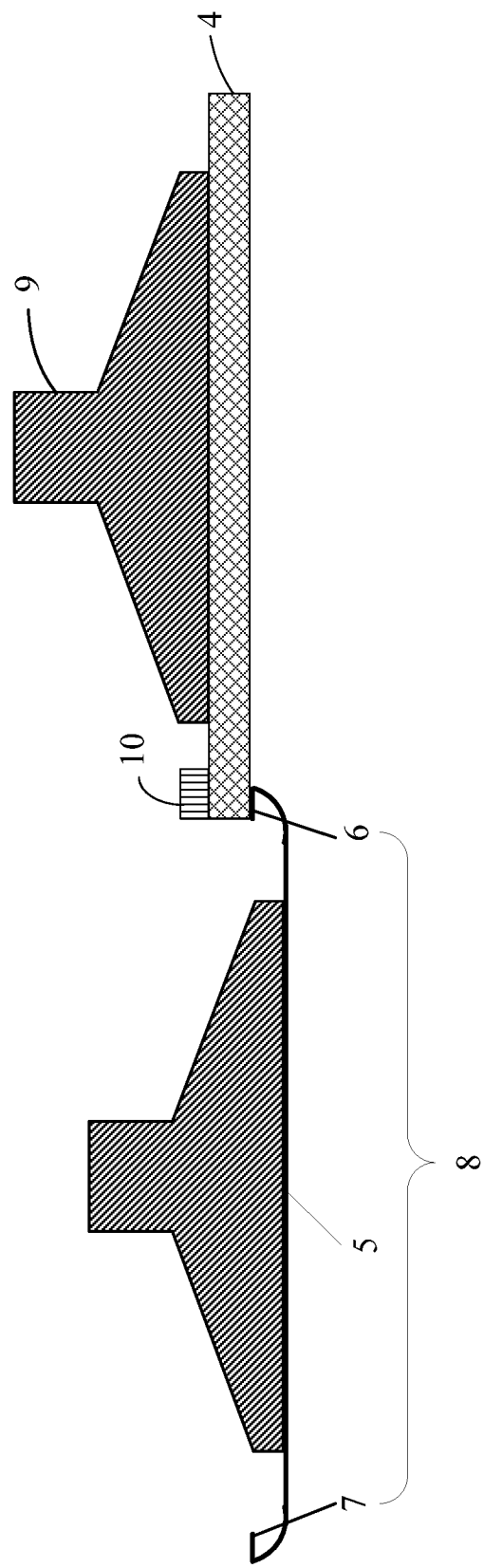

Further, the first supporting portion 6 of the substrate lining 8 and the first end of the substrate assembly 4 are laminated by an elongated indenter 10, as shown in FIG. 3.

Specifically, the area of an indenter bottom of the elongated indenter 10 is slightly larger than the area of a pressing region of the first supporting portion 6 of the substrate lining 8 and the first end of the substrate assembly 4.

Figure 4:
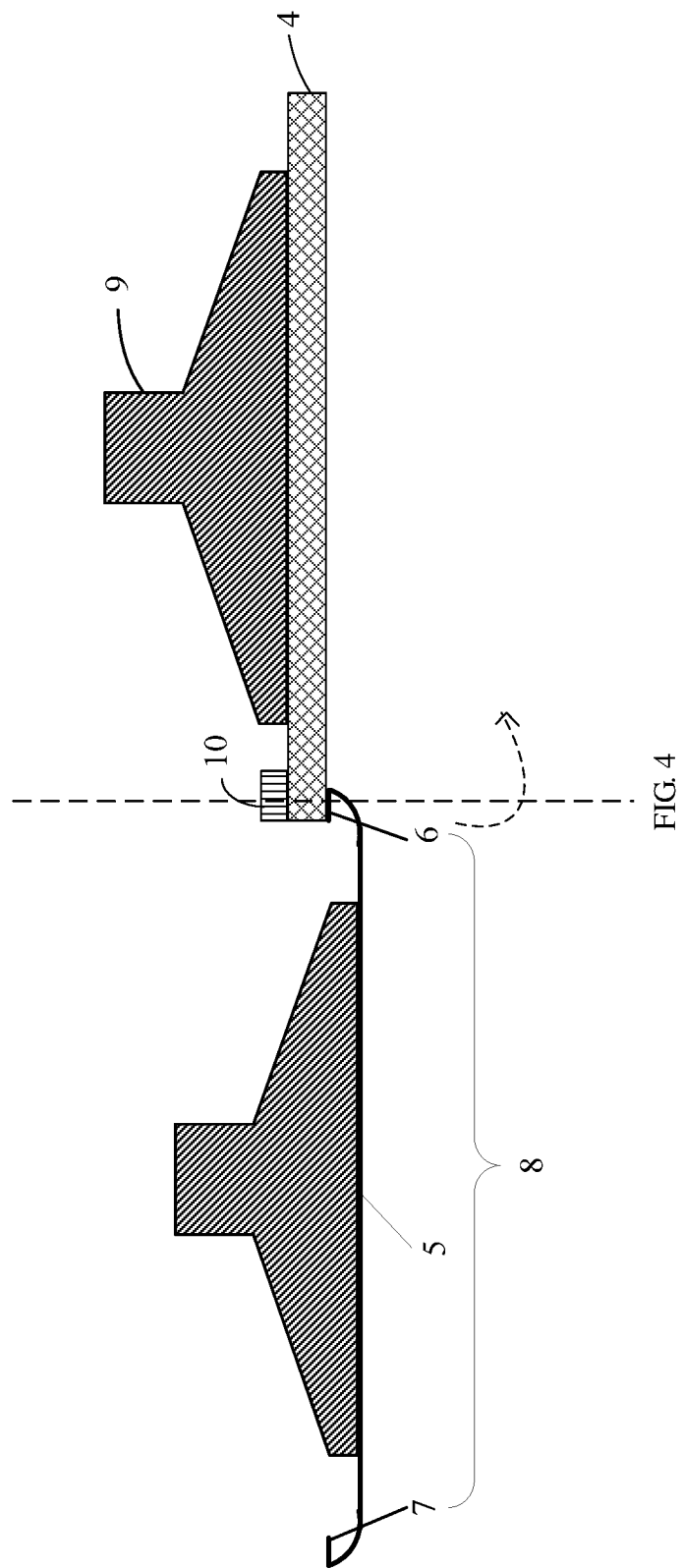

Further, the substrate lining 8 is rotated with a Y-axis as a central axis where the pressing region is located, and the rotation angle is 180 degrees, as shown in FIG. 4.

Specifically, during the rotation of the substrate lining 8, the substrate lining 8 and the substrate assembly 4 are slowly laminated from left to right.

Figure 5:
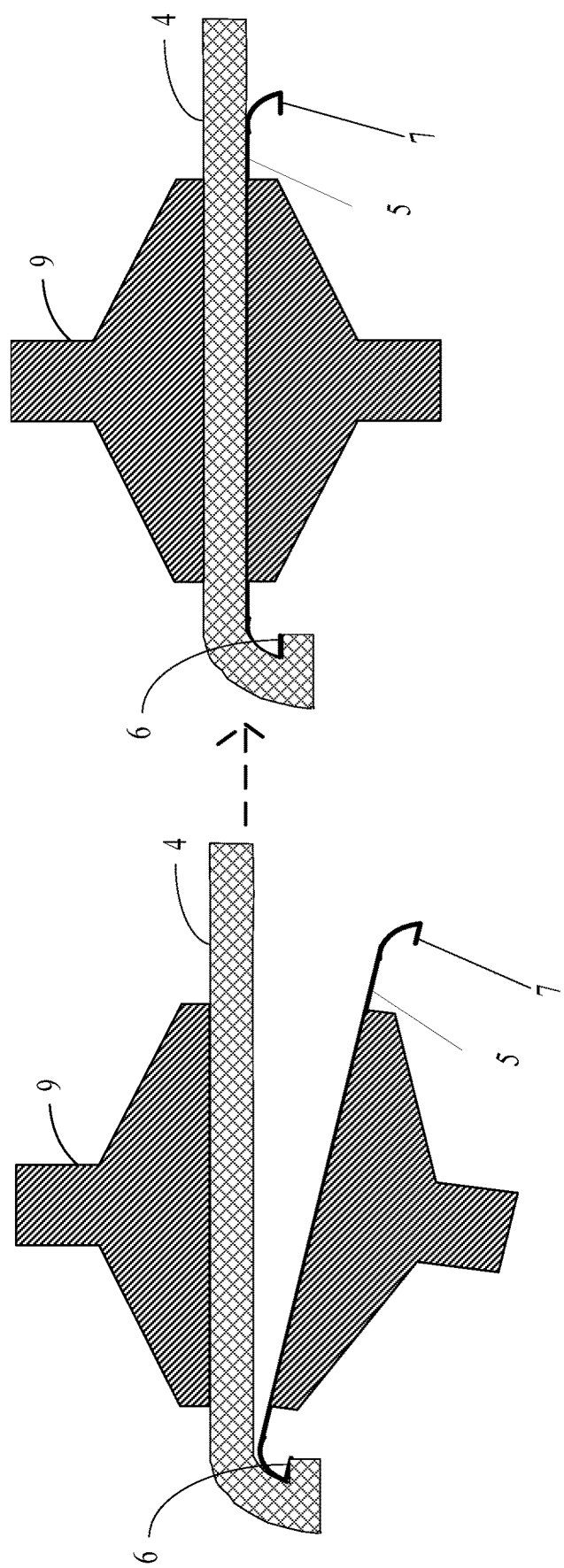

Further, during the rotation of the substrate lining 8, a U-shaped connecting portion 5 of the substrate lining 8 is laminated with a corresponding position of the substrate assembly 4, as shown in FIG. 5.

Specifically, in a process of laminating the U-shaped connecting portion 5 of the substrate lining 8 and the corresponding position of the substrate assembly 4, a slow laminating manner from left to right is adopted.

Figure 6:
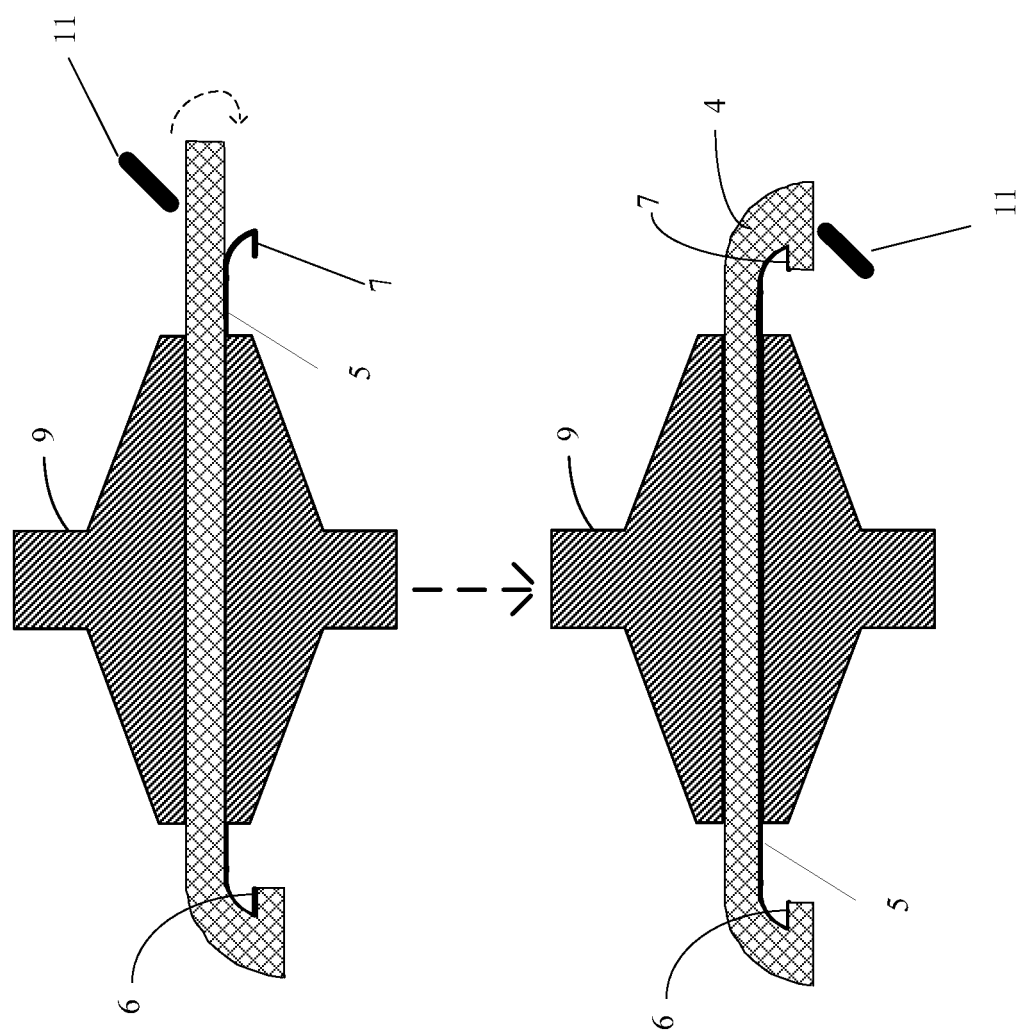

Further, the micrometer-scale vacuum hole platform devices 9 adsorbed on the substrate lining 8 and the substrate assembly 4 are removed, and a roller 11 is used to complete pressing a position of the substrate assembly 4 corresponding to a second supporting portion 7 of the substrate lining 8 and the second supporting portion 7 of the substrate lining 8, as shown in FIG. 6.

Specifically, the roller 11 keeps attached with the upper surface of the substrate assembly 4 during the pressing process, and the pressing process is rapidly completed along a direction of the second supporting portion 7 of the substrate lining 8.

Figure 7:
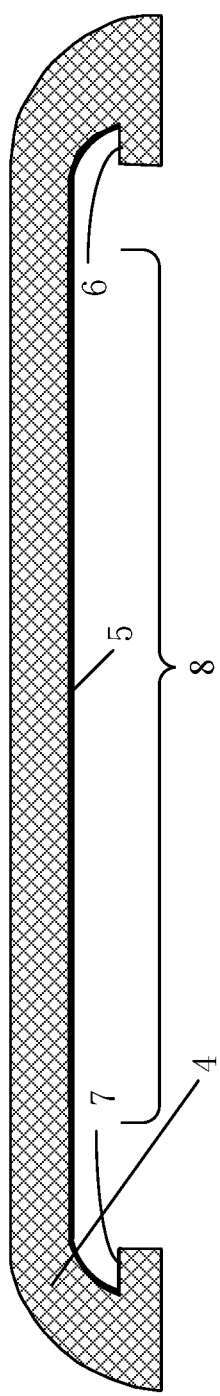

FIG. 7 is a schematic diagram illustrating a structure of the substrate assembly 4 disposed in the substrate lining 8 after the 3D lamination method described in FIGS. 2 to 6. The structure includes a substrate assembly 4 and a substrate lining 8, the substrate lining 8 including a U-shaped connecting portion 5, a first supporting portion 6 and a second supporting portion 7. The substrate assembly 4 includes a touch panel 1, a flexible substrate 3 and an optical adhesive 2 disposed on an upper surface and a lower surface of the touch panel 1 as well as on one side of the flexible substrate 3 away from the touch panel 1, as shown in FIG. 1.

Specifically, the first supporting portion 6 and the second supporting portion 7 of the substrate lining 8 are separately located at two ends of the U-shaped connecting portion 5 of the substrate lining 8 and extend toward each other.

Figure 8:
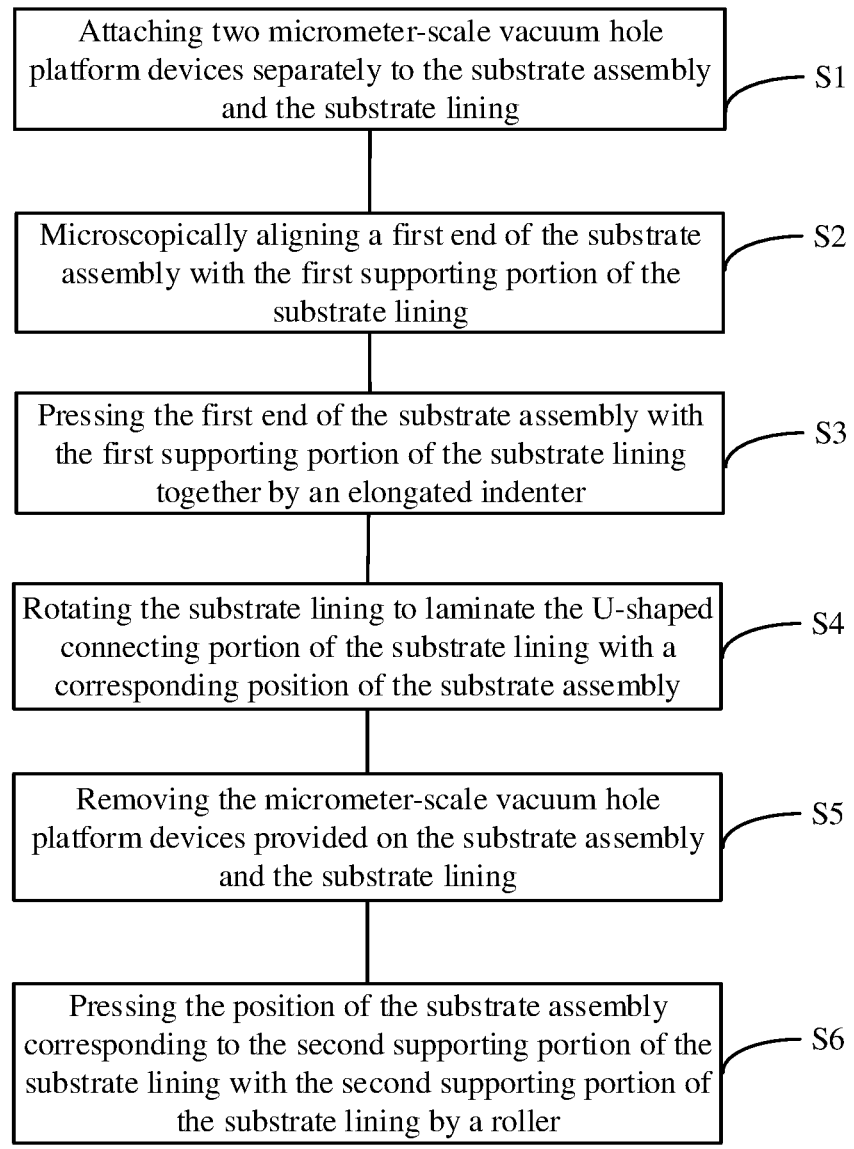
FIG. 8 is a schematic flowchart of a 3D lamination method in which the substrate assembly of the present disclosure is laminated with the substrate lining.

FIG. 8 is a schematic flowchart of a 3D lamination method in which the substrate assembly of the present disclosure is laminated with the substrate lining. The method includes following blocks.

In block S1, attaching two micrometer-scale vacuum hole platform devices 9 separately to the substrate assembly 4 and the substrate lining 8.

In block S2, microscopically aligning a first end of the substrate assembly 4 with the first supporting portion 6 of the substrate lining 8.

In step S3, pressing the first end of the substrate assembly 4 with the first supporting portion 6 of the substrate lining 8 together by an elongated indenter 10.

In block S4, rotating the substrate lining 8 to laminate the U-shaped connecting portion 5 of the substrate lining with a corresponding position of the substrate assembly 4.

In block S5, removing the micrometer-scale vacuum hole platform devices 9 separately provided on the substrate assembly 4 and the substrate lining 8.

In block S6, pressing the position of the substrate assembly 4 corresponding to the second supporting portion 7 of the substrate lining 8 with the second supporting portion 7 of the substrate lining 8 by a roller 11.

Figure 9:
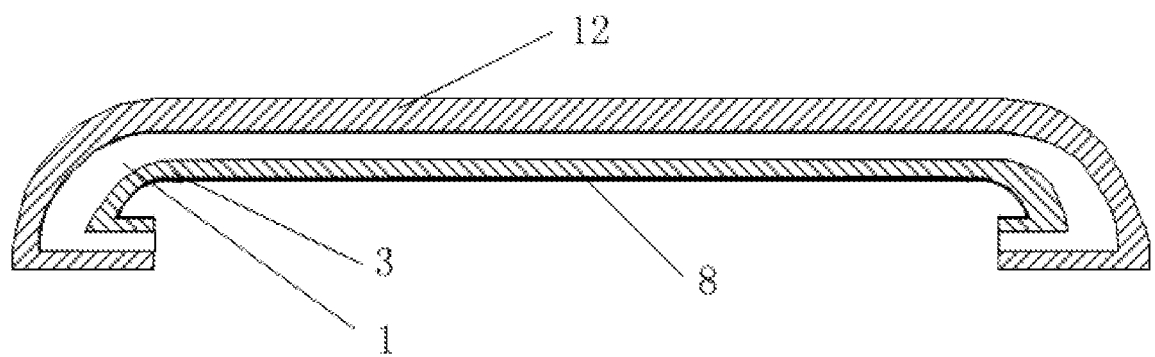
FIG. 9 is a schematic structural view of a display panel of the present disclosure.

FIG. 9 is a schematic structural view of a display panel of the present disclosure. The structure of the display panel includes a substrate lining 8, a flexible substrate 3, a touch panel 1 and a glass cover 12. The substrate lining 8 includes a U-shaped connecting portion 5, a first supporting portion 6 and a second supporting portion 7 separately located at two ends of the U-shaped connecting portion 5 and extending toward each other, as shown in FIG. 7.

Specifically, the lamination of the substrate assembly 4 is completed first, and secondly the substrate assembly 4 is disposed on the substrate lining 8 through the 3D lamination means in FIGS. 2-7, and then the glass cover 12 is laminated to the upper surface of the substrate assembly 4. The cover 12 can be laminated on the substrate assembly 4 in a specific manner of vacuum laminating.

Figure 10:
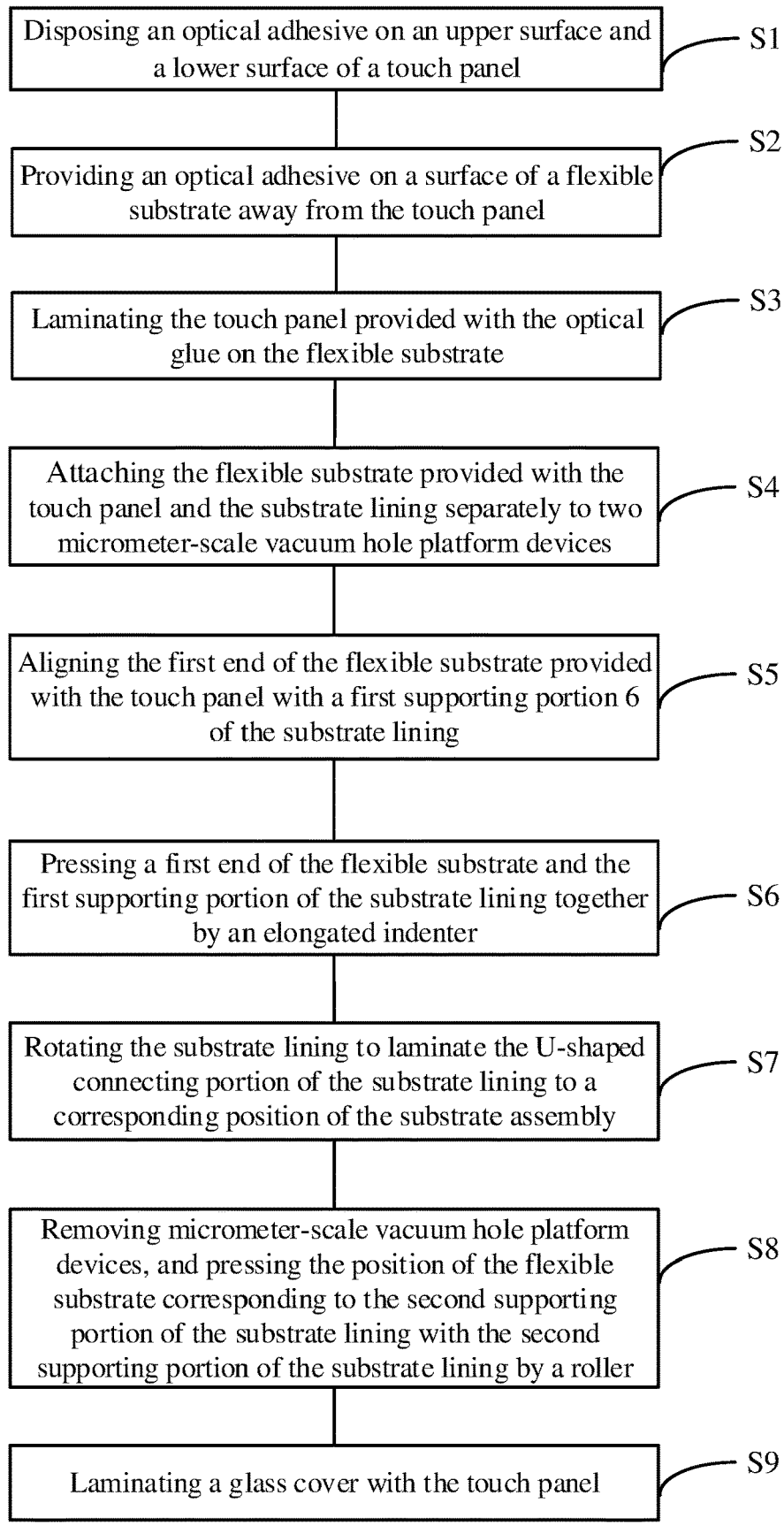
FIG. 10 is a schematic flowchart of a method for manufacturing a display panel according to the present disclosure.

FIG. 10 is a schematic flowchart of a method for manufacturing a display panel according to the present disclosure. The method includes following blocks.

In block S1, the method includes disposing an optical adhesive 2 on an upper surface and a lower surface of a touch panel 1.

In block S2, the method includes providing an optical adhesive 2 on a surface of a flexible substrate 3 away from the touch panel 1.

In block S3, laminating the touch panel 1 provided with the optical glue 2 on the flexible substrate 3.

In block S4, attaching the flexible substrate 3 provided with the touch panel 1 and the substrate lining 8 separately to two micrometer-scale vacuum hole platform devices 9.

In block S5, aligning the first end of the flexible substrate 3 provided with the touch panel 1 with a first supporting portion 6 of the substrate lining 8.

In block S6, pressing a first end of the flexible substrate 3 and the first supporting portion 6 of the substrate lining 8 together by an elongated indenter 10.

In block S7, rotating the substrate lining 8 to laminate the U-shaped connecting portion 5 of the substrate lining 8 to a corresponding position of the substrate assembly 4.

In block S8, removing the micrometer-scale vacuum hole platform devices 9, and pressing the position of the flexible substrate 3 corresponding to the second supporting portion 7 of the substrate lining 8 with the second supporting portion 7 of the substrate lining by a roller 11.

In block S9, laminating a glass cover 12 with the touch panel 1.

Specifically, the process that the glass cover 12 is laminated to the touch panel 1 is performed in a vacuum environment.

In the method for manufacturing a display panel, the system for manufacturing a display panel, and the display panel of the present disclosure, the substrate assembly 4 is laminated on the substrate lining 8, and the substrate lining 8 includes a U-shaped connecting portion 5 and a first supporting portion 6 and a second supporting portion 7 separately provided on two ends of the U-shaped connecting portion 5 and extending toward each other. The substrate assembly 4 includes a flexible substrate 3 and a touch panel 1 provided on the flexible substrate 3 through the optical adhesive 2. The method for laminating the substrate assembly 4 on the substrate lining 8 includes aligning the first end of the substrate assembly 4 with the first supporting portion 6 in the substrate 8, pressing the first end of the substrate assembly 4 with the first supporting portion 6 of the substrate lining 8, laminating the U-shaped connecting portion 5 of the substrate lining 8 to the corresponding position of the substrate assembly 4 by rotating the substrate lining 8, and pressing the position of the substrate assembly 4 corresponding to the second supporting portion 7 of the substrate lining 8 with the second supporting portion 7 of the substrate lining 8. The percentage of the display region of the display panel manufactured by the method is increased.

The above description merely illustrates some exemplary embodiments of the disclosure, which are not intended to limit the scope of the disclosure to these specific embodiments. Any equivalent structural or flow modifications or transformations made to the disclosure, or any direct or indirect applications of the disclosure on any other related fields, shall all fall in the scope of the disclosure.

What is claimed is:

1. A method for manufacturing a display panel, comprising:

disposing a touch panel on one side of a flexible substrate;

providing a substrate lining on the other side of the flexible substrate, the substrate lining comprising a U-shaped connecting portion, a first supporting portion and a second supporting portion separately provided on two ends of the U-shaped connecting portion and extending toward each other;

aligning a first end of the flexible substrate provided with the touch panel with the first supporting portion of the substrate lining;

pressing the first end of the flexible substrate provided with the touch panel with the first supporting portion of the substrate lining;

laminating the U-shaped connecting portion of the substrate lining with a corresponding position of the flexible substrate provided with the touch panel by rotating the substrate lining; and pressing a position of the flexible substrate provided with the touch panel corresponding to the second supporting portion of the substrate lining with the second supporting portion of the substrate lining.

2. The method for manufacturing a display panel according to claim 1, wherein before aligning the first end of the flexible substrate provided with the touch panel with the first supporting portion of the substrate lining, further comprising:

attaching the flexible substrate provided with the touch panel and the substrate lining separately to two micrometer-scale vacuum hole platform devices.

3. The method of manufacturing a display panel according to claim 1, the pressing the first end of the flexible substrate provided with the touch panel with the first supporting portion of the substrate lining comprises:
pressing the flexible substrate provided with the touch panel with the substrate lining by an indenter.

4. The method of manufacturing a display panel according to claim 1, pressing the position of the flexible substrate provided with the touch panel corresponding to the second supporting portion of the substrate lining with the second supporting portion of the substrate lining, comprises:
using a roller to complete pressing the position of the substrate assembly corresponding to the second supporting portion of the substrate lining with the second supporting portion of the substrate lining.

5. The method of manufacturing a display panel according to claim 1, before disposing the touch panel on the flexible substrate, further comprising:
disposing an optical adhesive on an upper surface and a lower surface of the touch panel with a size of the optical adhesive smaller than a size of the touch panel; and
disposing an optical adhesive on a surface of the flexible substrate away from the touch panel with a size of the optical adhesive smaller than a size of the flexible substrate.

6. The method for manufacturing a display panel according to claim 1, further comprising:
disposing a glass cover on the touch panel.

7. A system for manufacturing a display panel, comprising:
a first platform;
a second platform;
a substrate assembly attached on the first platform and comprising:
a touch panel;
a flexible substrate coupled to the touch panel and located below the touch panel;
optical adhesive attached on two sides of the touch panel and the flexible substrate;
a substrate lining attached on the second platform and comprising:
a U-shaped connecting portion;
a first supporting portion and a second supporting portion which are separately located at two ends of the U-shaped connecting portion and extend toward each other;
a first apparatus configured to press a first end of the substrate assembly with an alignment region of the first supporting portion of the substrate lining, and to rotate the second platform to laminate the U-shaped connecting portion of the substrate lining with a position of the substrate assembly corresponding to the U-shaped connecting portion; and
a second apparatus configured to complete laminating a position of the substrate assembly corresponding to the second supporting portion of the substrate lining with the second supporting portion of the substrate lining.

8. The system for manufacturing a display panel according to claim 7, wherein the first apparatus is an elongated indenter, the first platform and the second platform are two micrometer-scale vacuum hole platform devices, and the system further comprises a third apparatus which is a roller.

* * * * *